March 29, 1938.  A. P. WOOD  2,112,747
DYNAMO-ELECTRIC MACHINE
Filed May 13, 1936
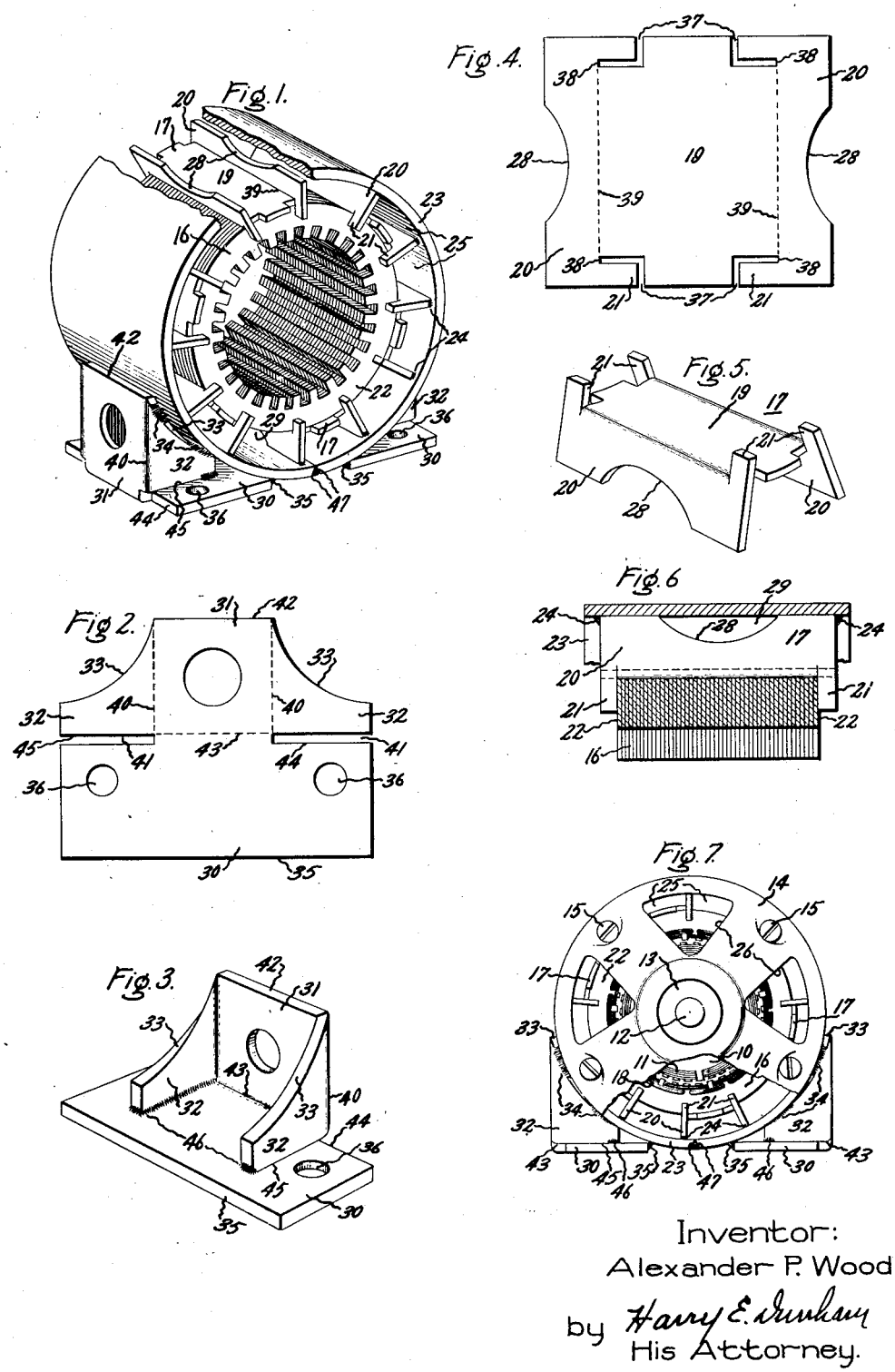
Inventor:
Alexander P. Wood,
by Harry E. Dunham
His Attorney.

Patented Mar. 29, 1938

2,112,747

UNITED STATES PATENT OFFICE 2,112,747

DYNAMO-ELECTRIC MACHINE

Alexander P. Wood, Schenectady, N. Y., assignor to General Electric Company, a corporation of New York Application May 13, 1936, Serial No. 79,501

7 Claims. (Cl. 171—252)

My invention relates to improvements in dynamo-electric machines and particularly to a fabricated construction for the stationary member of dynamo-electric machines, and a method of making the same.

An object of my invention is to provide an improved and simplified unitary fabricated stationary member for a dynamo-electric machine, and a method of making the same.

Further objects and advantages of my invention will become apparent and my invention will be better understood from the following description referring to the accompanying drawing, and the features of novelty which characterize my invention will be pointed out with particularity in the claims annexed to and forming a part of this specification.

In the drawing, Fig. 1 is a perspective view of a stationary member of a dynamo-electric machine embodying my invention; Fig. 2 is a plan view of a sheet metal punching from which a foot for the stationary member is made; Fig. 3 is a perspective view of the foot for the stationary member; Fig. 4 is a plan view of a sheet metal punching from which a clamp for the stationary member is made; Fig. 5 is a perspective view of a core lamination clamp utilized in the stationary member; Fig. 6 is a partial sectional view longitudinally through the stationary member of Fig. 1 illustrating the relative arrangement of the laminated core structure and the clamp within the cylindrical casing; and Fig. 7 is an end view of a dynamo-electric machine having a stationary member embodying my invention.

In the drawing, I have shown my invention in connection with a dynamo-electric machine having a rotatable member 10 provided with windings 11 and mounted upon a shaft 12. This shaft is supported in bearings mounted in bearing housings 13 formed in end shields 14, which are secured by bolts 15 to the stationary member. The stationary member is provided with a winding 18, and includes a frame having a core structure of assembled laminations 16, which are held in assembled relation by a plurality of circumferentially spaced U-shaped clamps 17. The intermediate portions 19 of each of the U-shaped clamps is curved to conform to the core structure, so as to obtain good thermal contact with the outer peripheral surface of the core structure. Flanges 20 of the U-shaped clamps extend radially outwardly from the intermediate portion, and are provided with integral retaining tongues or holding elements 21 extending radially inwardly from each end of the arms 20 about ends 22 of the core structure to hold or retain the laminations 16 in assembled relation. A cylindrical sheet metal shell 23 is arranged about the outer edges of the flanges of the U-shaped clamps, and the ends of each flange of these clamps are welded at 24 to the cylindrical shell.

The flanges 20 of the U-shaped clamps are arranged as core supporting and spacing elements to support the core structure within the shell 23 and in spaced relation thereto, so as to provide a plurality of longitudinally extending ventilating passages 25 about the outer periphery of the core structure and between the flanges 20 of the U-shaped clamps. Since the intermediate portions of the clamps 17 are in good thermal contact with the core, the flanges 20 are further utilized as radiating fins for dissipating the heat from the core structure. Cooling air may be blown through the ventilating passages 25 from the external atmosphere through openings 26 formed in the end shield 14 of the motor frame. The air may be circulated by a fan mounted on the motor shaft 12, or by any other suitable arrangement. To further increase the cooling of the machine and to prevent localized heating, longitudinally extending arcuate notches 28 are formed in the outer edges of the flanges 20 of the U-shaped clamps to provide a circumferentially extending ventilating passage 29 about the machine between the sides of these slots and the cylindrical shell 23. A good heat conductive path is provided between the core laminations and the cylindrical shell 23 through the welded flanges of the U-shaped clamps and this further increases the cooling capacity of this frame construction.

The cylindrical shell 23 is provided with a pair of fabricated sheet metal feet, each having a substantially rectangular supporting plate 30 and a substantially rectangular portion 31 integrally formed with the supporting plate at the central portion of one side thereof and arranged at substantially right angles thereto. On each of the two sides of the rectangular portion at right angles to the supporting plate, two gussets 32 are integrally formed with the rectangular portion 31 and extend at substantially right angles to the supporting plate and to the rectangular portion. Each of these gussets 32 is provided with an arcuate edge 33 engaging the outer surface of the cylindrical shell 23 and is secured thereto by welding at 34 to the surface of the shell. The supporting plate is welded at its outer edge 35 to the cylindrical shell and is provided with openings 36 through which bolts may be inserted for securing the dynamo-electric machine to a support.

In fabricating my improved stationary member, I prefer first to fabricate the U-shaped clamps and the unitary sheet metal feet.

The clamps 17 are formed by punching from a sheet metal blank a substantially rectangular member, as shown in Fig. 4, having a pair of spaced L-shaped slots 37 formed on each of two opposite sides thereof, with the sides of the L's extending in opposite directions to each other and away from the intermediate portion 19 of the rectangular member. The outer ends 38 of the inner sides of the L-shaped slots are spaced apart a distance corresponding to the desired length of the laminated core with which the clamps are to be used. The same punching operation which forms the rectangular member with the L-shaped slots in two sides thereof also punches the longitudinally extending arcuate notches 28 in each of the two opposite sides of the rectangular member intermediate the two sides in which the L-shaped slots 37 are formed. After this punching operation, the two sides 20 of the rectangular member having the longitudinally extending slots are bent along a line extending between the outer ends 38 of the inner sides of the L-shaped slots, as indicated by the dotted line 39, to provide flanges 20 extending at an angle to the intermediate portion 19 of the rectangular member, and the intermediate portion is pressed to the desired curvature of the surface of the core structure over which it is to be placed, thus forming a U-shaped clamp, as shown in Fig. 5.

The fabricated feet for the stationary member of the dynamo-electric machine are each made by punching from a sheet metal blank the substantially rectangular supporting plate 30 with a substantially rectangular portion 31 extending at substantially right angles from the central portion of one side of the rectangular supporting plate, as shown in Fig. 2. This punching operation also forms the gussets 32 extending from each side 40 of the rectangular portion 31 at right angles to the rectangular supporting plate, and slots 41 between each of the gussets 32 and the rectangular supporting plate. These gussets are formed with an arcuate edge 33 along the side thereof opposite the slot 41 and extending to the outer edge 42 of the rectangular portion 31. Mounting holes 36 also are punched in the mounting plate simultaneously with the punching of the foot from the sheet metal blank. After the punching operation, the substantially rectangular portion 31 is bent at an edge 43 thereof extending between the inner ends of the slots 41 to a position at substantially right angles to the rectangular supporting plate 30 and with the surface adjacent the upper surface of the supporting plate slightly displaced from the edge 44 of the supporting plate adjacent the slot, so that the edge 45 of the gussets 32 adjacent the slot extend in the same plane as the upper surface of the supporting plate. The gussets are then bent at their integral connection 40 with the rectangular portion 31 to a substantially right angle with respect to the rectangular portion and to the supporting plate, so that the edge 45 thereof adjacent the supporting plate is substantially in contact therewith. The gussets are then welded at 46 to the rectangular supporting plate to form a foot, as shown in Fig. 3.

In fabricating the stationary member, the laminations are assembled to form the core structure 16 and are clamped under pressure in the desired assembled relation. The fabricated U-shaped clamps are then placed about the outer periphery of the assembled laminations in circumferentially spaced relation, with the intermediate portions 19 of the U-shaped clamps in good thermal contact with the outer peripheral surface of the core structure, and the flanges 20 of the U-shaped clamps 17 extending radially away from this peripheral surface. The tongues 21 extending from the inner edges of the arms 20 are arranged in contact with the sides 22 of the core structure, and the clamping pressure upon the assembled laminations is then removed. The clamps 17 then securely clamp together the assembled laminations between the tongues 21. The cylindrical shell 23 is then arranged about the outer edges of the flanges of the U-shaped clamps, and the abutting ends 47 of the shell 23 are welded together. In order to secure the clamps in position within the shell and to provide a better thermal contact therebetween, the outer edges of the flanges 20 of the clamps 17 are welded at 24 to the cylindrical sheet metal shell 23. A pair of fabricated feet are then arranged with the arcuate edge 33 of the gussets 32 engaging the outer surface of the cylindrical casing and these arcuate edges are then welded at 34 to the shell. In order to further secure the feet to the shell, the outer edges 35 of the supporting plates 30 are also welded to the cylindrical shell.

While I have illustrated and described one embodiment of my invention, modifications thereof will occur to those skilled in the art. I desire it to be understood, therefore, that my invention is not to be limited to the particular arrangement and method disclosed, and I intend in the appended claims to cover all modifications which do not depart from the spirit and scope of my invention.

What I claim as new and desire to secure by Letters Patent of the United States is:

1. A stationary member for a dynamo-electric machine or the like, including an assembly of laminations forming a core structure, means including a plurality of circumferentially spaced and axially extending U-shaped clamps for retaining said laminations in assembled relation, each of said U-shaped clamps having an intermediate portion arranged in good thermal contact with the peripheral surface of said structure and having heat radiating flanges extending radially outward from said intermediate portion, said clamps having tongues extending radially inward from said flanges and clamping the ends of said core structure, and a cylindrical shell arranged about said flanges.

2. A stationary member for a dynamo-electric machine or the like including an assembly of laminations forming a core structure, means including a plurality of circumferentially spaced clamps having tongues extending inwardly adjacent the ends thereof about the sides of said core structure for retaining said laminations in assembled relation, each of said clamps being of U-shaped cross-section and having axially extending flanges and a curved intermediate portion arranged in contact with a peripheral surface of said core structure, and a cylindrical shell cooperating with the outer edges of the flanges of said U-shaped clamps to form a plurality of axially extending ventilating passages about said core structure.

3. A stationary member for a dynamo-electric machine or the like including an assembly of laminations forming a core structure, a cylindrical shell arranged in spaced relation about said core structure, and means including a plurality of circumferentially spaced U-shaped clamps for retaining said laminations in assembled relation, each of said U-shaped clamps having a curved intermediate portion arranged in good thermal contact with a peripheral surface of said core structure and flanges extending radially outwardly therefrom into contact with said cylindrical shell to provide a plurality of heat radiating fins and a plurality of axially extending ventilating passages about said core structure, the outer edges of said flanges being formed with a longitudinally extending notch to provide a circumferential ventilating passage between said arms and said cylindrical shell.

4. A U-shaped clamp for retaining core laminations in assembled relation comprising a longitudinally extending intermediate portion, flanges formed integral with and extending outwardly from said intermediate portion and arranged to provide core spacing elements, and tongues extending from said intermediate portion in an opposite direction from said flanges and arranged to provide lamination holding elements.

5. A U-shaped clamp for retaining core laminations in assembled relation comprising a longitudinally extending intermediate portion, flanges extending outwardly from said intermediate portion and being formed integral therewith, the outer edges of said flanges being formed with a longitudinally extending notch intermediate the ends thereof, and a plurality of tongues extending from said flanges in an opposite direction thereto.

6. The method of fabricating a clamp for retaining a plurality of laminations in assembled relation comprising punching a pair of spaced substantially L-shaped slots on each of two opposite sides of a sheet metal blank with one of the sides of each of the L-shaped slots extending inwardly from the edges of the blank and the other sides of the slots in opposite directions from the portion of the blank intermediate the slots, and bending the sheet metal blank along a line extending between the outer ends of the inner sides of the L-shaped slots to provide flanges and tongues extending at an angle to the intermediate portion of the blank forming a substantially U-shaped clamp.

7. The method of fabricating a clamp for retaining a plurality of laminations in assembled relation comprising punching from a sheet metal blank a substantially rectangular member with a longitudinally extending notch in each of two opposite sides thereof and a pair of spaced substantially L-shaped slots on each of the two opposite sides of the rectangular member intermediate the two notched sides with one of the sides of each of the L-shaped slots extending inwardly from the edges of the rectangular member and the other sides of the slots in opposite directions from the portion of the rectangular member intermediate the slots, and bending the rectangular member along a line extending between the outer ends of the inner sides of the L-shaped slots to provide flanges and tongues extending at an angle to the intermediate portion to form a substantially U-shaped clamp.

ALEXANDER P. WOOD.